United States Patent
Wakabe et al.

[19]

[11] Patent Number: 6,136,464
[45] Date of Patent: Oct. 24, 2000

[54] BATTERY AND SAFETY DEVICE THEREFOR

[75] Inventors: Masayuki Wakabe; Jun-ichi Miura; Yasuharu Sakai; Tetsuzo Kojima; Takao Maki, all of Kyoto, Japan

[73] Assignee: Japan Storage Battery Co., Ltd., Kyoto, Japan

[21] Appl. No.: 08/398,522

[22] Filed: Mar. 3, 1995

[30] Foreign Application Priority Data

| Mar. 3, 1994 | [JP] | Japan | 6-060115 |
| Aug. 31, 1994 | [JP] | Japan | 6-207027 |
| Dec. 6, 1994 | [JP] | Japan | 6-330528 |

[51] Int. Cl.$^7$ .................................................. H01M 4/90
[52] U.S. Cl. ........................... 429/53; 429/54; 429/59; 429/82
[58] Field of Search ...................... 429/57, 59, 53, 429/54, 72, 61, 82

[56] References Cited

U.S. PATENT DOCUMENTS

| 2,061,981 | 11/1936 | Rhodes | 175/315 |
| 3,081,366 | 3/1963 | Belove . | |
| 3,427,205 | 2/1969 | Plitt et al. | 136/133 |
| 4,943,497 | 7/1990 | Oishi et al. | 429/53 |
| 5,208,122 | 5/1993 | Hirakawa et al. | 429/222 |

FOREIGN PATENT DOCUMENTS

| 30327366 | 8/1989 | European Pat. Off. . |
| 327366 | 8/1989 | European Pat. Off. . |
| 2096295 | 2/1972 | France . |
| 6005273 | 6/1992 | Japan . |
| 6111802 | 4/1994 | Japan . |
| 6111803 | 4/1994 | Japan . |
| 6111804 | 4/1994 | Japan . |
| 6111805 | 4/1994 | Japan . |
| 631932 | 12/1948 | United Kingdom . |
| 2204996 | 10/1988 | United Kingdom . |
| 2204996 | 11/1988 | United Kingdom . |
| 2217109 | 10/1989 | United Kingdom . |

OTHER PUBLICATIONS

Abstract of JP–A–06 005273, vol. 18, No. 195 (E–1533), Apr. 5, 1994.
Abstract of JP–A–60 198051, vol. 10, No. 42 (E382), Feb. 19, 1986.
Patent Abstracts of Japan, vol. 018, No. 195 (E–1533), Apr. 5, 1994 & JP 06 005273.
Patent Abstracts of Japan, vol. 010, No. 042 (E–382), Feb. 19, 1986 & JP 60 198051 A.
Patent Abstracts of Japan, vol. 011, No. 036 (E–477), Feb. 3, 1987 & JP 61 206162 A.
Patent Abstracts of Japan, vol. 018, No. 139 (E–1519), Mar. 8, 1994 & JP 05 325938 A.
Patent Abstracts of Japan, vol. 012, No. 420 (E–679), Nov. 8, 1988 & JP 63 158739 A.
Patent Abstracts of Japan, vol. 016, No. 318 (E–1232), Jul. 13, 1992 & JP 04 092360 A.
Patent Abstracts of Japan, vol. 016, No. 279 (E–1220), Jun. 22, 1992 & JP 04 068516 A.

*Primary Examiner*—Maria Nuzzolillo
*Attorney, Agent, or Firm*—Sughrue, Mion, Zinn, Macpeak & Seas, PLLC

[57] ABSTRACT

A safety device for a storage battery includes a charge-discharge lead one end of which is connected to a positive electrode side of the storage battery and the other end of which is connected to a positive terminal of the storage battery; a pressure-sensing device which deforms in response to the increase of the pressure in the storage battery; and a cutting device for cutting the charge-discharge lead. The cutting device is pressed by the deformation of the pressure-sensing device to cut the charge-discharge lead.

15 Claims, 8 Drawing Sheets

BATTERY AND SAFETY DEVICE THEREFOR

BACKGROUND OF THE INVENTION

1. Field of the Invention

The present invention relates to a structure of a terminal for a battery and safety device therefor being operational when the pressure in the battery increases.

2. Description of the Conventional Art

Recently, electronic equipment such as home video decks, portable CD players and portable telephones have come into wide use. Since these electronic equipments are becoming more compact while exhibiting higher performance, efforts are also being made to reduce their size but increase the capacity of sealed batteries which supply power to the equipment. A problem with such small, sealed batteries is that once the internal pressure increases for some reason, rapid battery failure can potentially occur.

For example, if heat is generated due to the overcharging of a storage battery or if a short-circuit current flows through the load that is short-circuited due to wrong use of the battery during discharging, the electrolyte in the battery will either decompose or evaporate or, alternatively, the product of abnormal reaction due, for example, to the decomposition of electrode active materials will fill the battery space, thereby causing an abnormal increase in the internal pressure or the temperature of the battery.

To prevent heat generation or battery failure due to these abnormal behaviors, it is required that the interior of the battery is provided with a structure that senses a certain pressure in the battery in response to one of those phenomena, thereby breaking the circuit to the load.

Figure 1:
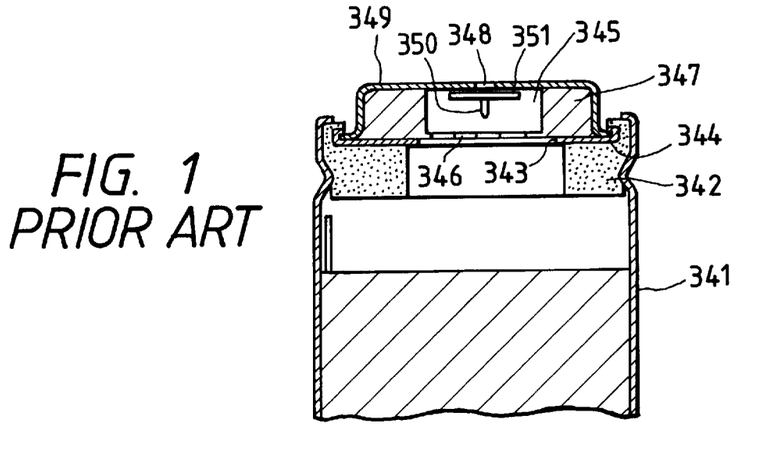
FIG. 1 shows a conventional safety device for use with a storage battery.

FIG. 1 shows a conventional safety device for use with a storage battery. Shown by 341 is a case, 342 is a gasket, 343 is a valve hole, 344 is a cover, 347 is an elastic valve body, 345 is a recess in the valve body 347, 346 is a thin-walled portion of the valve body 347, 348 is a gas vent hole, 349 is a terminal plate in the form of a dish facing down, and 350 is a cutting blade.

Referring to FIG. 1, the pressure-releasing safety device is provided above the case 341 which also serves as the negative terminal. This safety device is comprised of the cover 344 which is fitted on top of the insulating gasket and which has the valve hole 343 in the center, the elastic valve body 347 in a cylindrical form that has the recess 345 and which has the thin-walled portion 346 in the bottom, and the terminal plate 349 that is fitted over the elastic valve body 347 and which has the gas vent hole 348 formed in the top. The recess 345 in the elastic valve body 347 contains the cutting blade 350 which projects toward the thin-walled portion 346. As the pressure in the battery increases, the thin-walled portion 346 of the elastic valve body 347 extends toward the cutting blade 350 until it contacts the latter. If the pressure increases further, the thin-walled portion 346 is broken by the cutting blade 350 and the gas in the battery will be released into air atmosphere via the gas vent hole 348 in the terminal plate 349, thereby ensuring against burst that would otherwise occur due to the pressure buildup in the battery.

The safety device described above prevents pressure buildup in storage batteries by breaking the safety valve, namely, the elastic valve body. However, the charging current and the discharging current will keep flowing irrespective of the pressure in the battery and, hence, the decomposition of the electrolyte and the active materials in the battery is promoted while, at the same time, the temperature of the battery will keep increasing.

Figure 2:
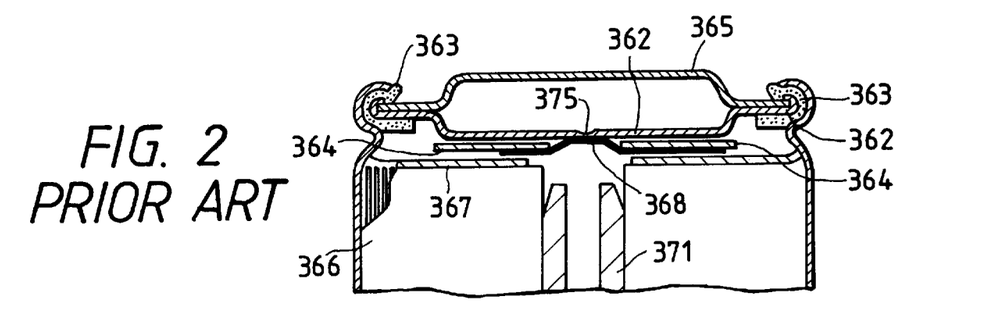
FIG. 2 shows another conventional safety device for use with a storage battery.

With a view to solving these problems of the conventional safety device for use on the storage battery, it has been proposed in Examined Japanese Patent Publication Hei. 2-288063 that the safety valve is adapted to deform to interrupt the current flow when the pressure in the battery reaches a specified level (see FIG. 2).

Referring to FIG. 2, numeral 363 designates a gasket, 362 is an explosion-proof valve that will deform upward as the pressure in the battery increases, 364 is a lead cutting stripper fitted in contact with the underside of the explosion-proof valve 362, 365 is a closing cover, 366 is an electromotive element, 367 is an insulator, 368 is a lead plate that is fitted beneath the lead cutting stripper 364 and which is connected both to an internal terminal (not shown) on the positive electrode of the electromotive element 366 and to the explosion-proof valve 362 connected to the positive terminal, 371 is a hub around which a sheet of the electromotive element is wound, and 375 is a thin-walled portion of the explosion-proof valve 362. The lead cutting stripper 364 has a hole formed therein, through which the lead plate 368 and the explosion-proof valve 362 are connected by welding.

The operating principle of this safety device is such that if a predetermined internal pressure is reached, the explosion-proof valve deforms and the contact at the connection between said valve and the lead plate is broken to interrupt the current flow.

However, if the contact between the lead plate and the explosion-proof valve is not broken for some reason, the charging current is not cut off and the battery may eventually be damaged. Thus, one cannot necessarily say that the safety device under consideration has succeeded in achieving a marked improvement in the reliability of small, a high-capacity storage battery. Under these circumstances, it is desired to develop a safety device of higher reliability for use with a storage battery, as well as a sealed storage battery incorporating that safety device.

Furthermore, recently, accompanying with the miniaturization of electronic instruments such as a portable radio telephone device, a portable personal computer and a portable video camera, a lithium-ion secondary battery has been made practicable, which has a high energy density and is superior in light-ability.

The lithium-ion secondary battery has the maximum electromotive force of 4.1 to 4.2 V. Therefore, the material of a positive terminal is limited to stainless steel, aluminum, titanium or the like which is stable even in high voltage.

Figure 3:
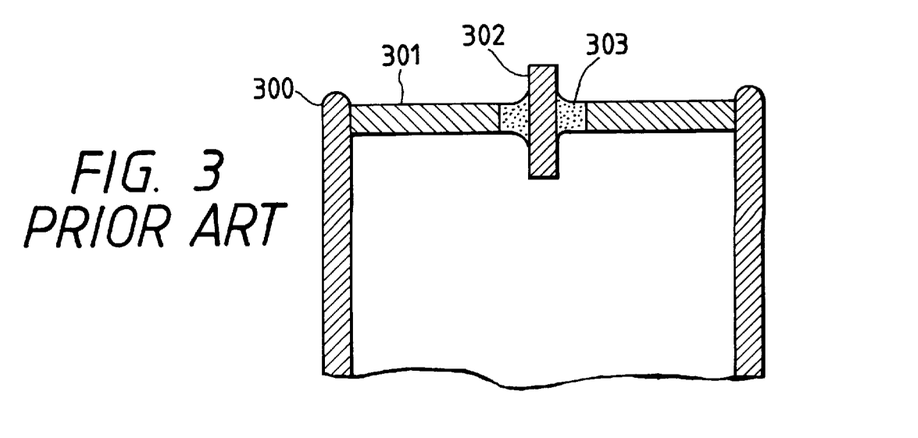
FIG. 3 shows a conventional square-type lithium-ion secondary battery using a hermetic seal method.

A conventional square-type lithium-ion secondary battery uses a hermetic seal method shown in FIG. 3. In FIG. 3, a metal cover 301 is mounted at an opening portion of an upper part thereof by a laser welding. The center portion of said metal cover 301 is provided with an opening into which the positive terminal 302 is inserted, and the opening is sealed by a fusion glass 303. As a result, the sealing of the inside of the battery can be maintained.

However, in the above described hermetic seal method, a large positive terminal 302 can not be assembled in the fusing glass 303. Therefore, it is difficult that an electric collecting lead is surely mounted at an end portion of the positive terminal 302 in the side of the inside of the battery. In addition, if the battery is integrated with a protection circuit and a outer terminal so as to form a battery pack, a lead for connecting to the protection circuit and outer terminal is hard to be mounted at the end portion of the positive terminal 302. Further, the fusing glass 303 is easily broken by a mechanical or heat shock.

In addition, in the hermetic method, the coefficient of thermal expansion of the positive terminal 302 has to be near that of the fusing glass 303. Accordingly, merely titanium or particular stainless steel can be used as the material of the positive terminal 302. Such a material is very expensive and has a problem with the workability thereof.

Accordingly, Unexamined Japanese Patent Publication Nos. Hei. 6-111802, Hei. 6-111803, Hei. 6-111804 and Hei. 6-111805 suggest a battery positive pin which is comprised of Al or Al-alloy and fixed to a battery can or battery cover. This battery positive pin is comprised of Al or Al-alloy so as to be superior in resistance to electric corrosion and low-cost to manufacturing.

However, since Al or Al-alloy is used for the material of the pin, it is difficult to surely connect the electric collecting lead to the pin by welding. In addition, the lead for electrically connecting to the protection circuit and outer terminal is also difficult to be mounted at the end portion of the battery cathode pin by welding.

SUMMARY OF THE INVENTION

Accordingly, it is an object of the present invention to provide a battery having a safety device which can suppress an increase in the temperature in the storage battery due to charging current or short-circuit in a sufficiently early stage so as to prevent the increase in the pressure in the battery and the resulting leakage of the electrolyte.

Further, it is another object of the present invention to provide a battery having a terminal which is easy to conduct an electrical connecting and has an excellent hermetical ability.

A safety device of the present invention for a storage battery comprises a charge-discharge lead one end of which is connected to a positive electrode side of the storage battery and the other end of which is connected to a positive terminal of the storage battery; pressure-sensing device which deforms in response to the increase of the pressure in the storage battery; and cutting device for cutting the charge-discharge lead, the cutting device being pressed by the deformation of the pressure-sensing device to cut the charge-discharge lead.

In a safety device of the present invention, when the pressure in the storage battery starts to increase for some reason such as overcharging or external short circuiting, the pressure-sensing device in the safety device deforms gradually under the increasing pressure, as a result of deformation, the charge-discharge lead cutting device is depressed so that its cutting blade is pressed against the lead to cut it, thereby interrupting the current flow.

Further, a battery of the present invention comprises power generation elements including an electric collection member; a casing which accommodates the power generation elements therein; a terminal which is mounted in the casing, the terminal including an upper end portion and a lower end portion, the electric collection member being crimped to the lower end portion; and a terminal plate crimped to the upper end portion.

In the battery according to the present invention, a terminal plate is crimped to the upper end portion of the terminal in an outside of the battery so that the lead can be connected to the terminal plate by welding or the like. Accordingly, if the battery is integrated with the outer terminal and the protection circuit as a battery pack, the terminal of the battery can be surely and easily connected to the protection circuit or the outer terminal. In addition, the electric collecting member is crimped to the lower end portion of the terminal so that an electric collector is easily bonded to the electric collecting member by crimping or the like. Accordingly, the electric connection between the terminal and the electric collector can be easily and surely conducted.

BRIEF DESCRIPTION OF THE DRAWINGS

In the accompanying drawings.

PREFERRED EMBODIMENTS OF THE PRESENT INVENTION

The preferred embodiments of the present invention with respect to a battery having a safety device or a terminal according to the present invention will now be described specifically referring to the accompanying drawings as follows.

First Embodiment

Figure 4:
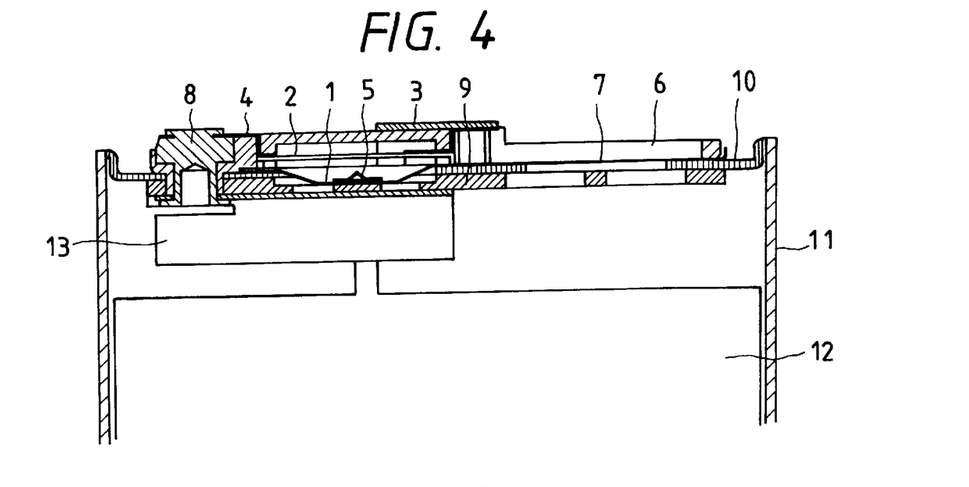
FIG. 4 is a sectional view showing an essential part of a storage battery incorporating a safety device of a first embodiment according to the present invention.
Figure 5:
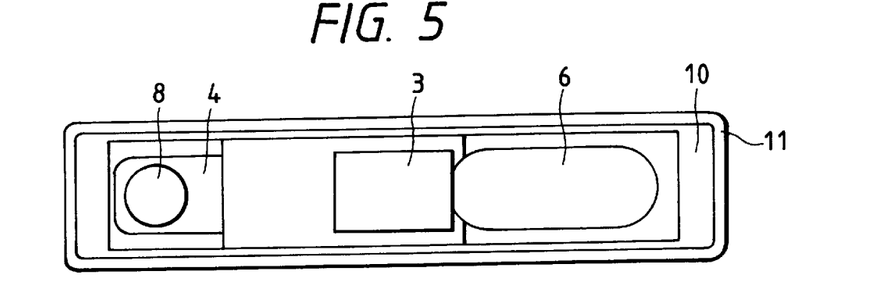
FIG. 5 is a top view of the battery shown in FIG. 4.
Figure 6A:
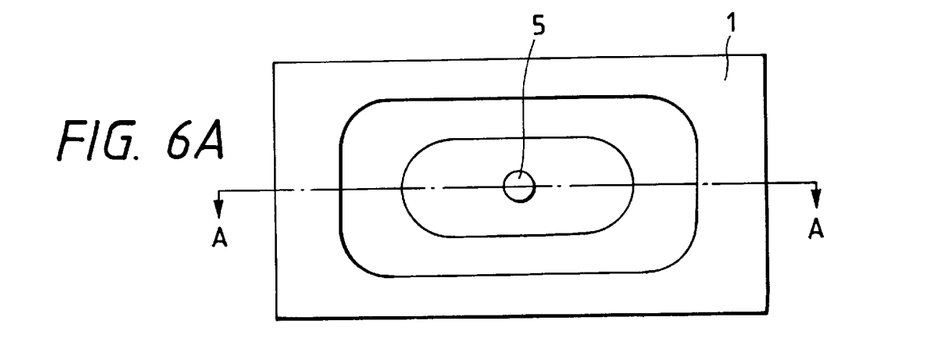
FIGS. 6A and 6B show an example of the pressure-sensing devices in the safety device according to the first embodiment.
Figure 6B:
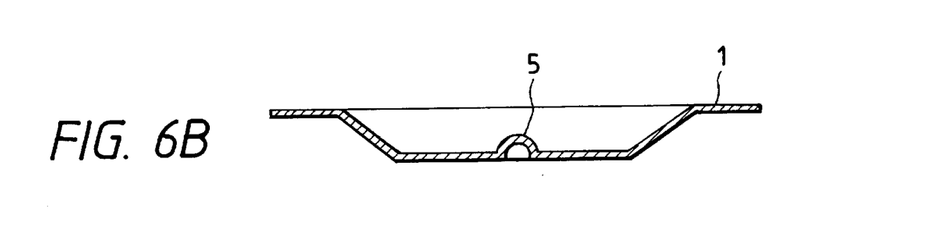
Figure 7:
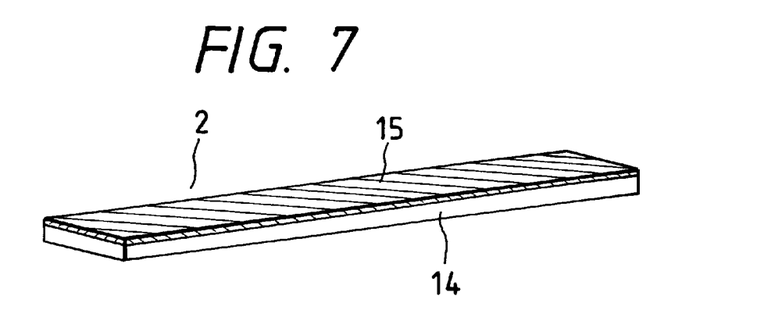
FIG. 7 shows an example of a charge-discharge lead in the safety device according to the first embodiment.

FIG. 4 is a sectional view showing an essential part of a storage battery incorporating a safety device of the first embodiment according to the present invention. FIG. 5 is a top view of the battery shown in FIG. 4. FIGS. 6A and 6B show an example of the pressure-sensing devices in the safety device. FIG. 7 shows an example of a charge-discharge lead in the safety device.

In those drawings, shown by 11 is a case which also serves as the negative terminal, 10 is a case cover, 12 is an electrode element, and 8 is a rivet. Shown by 6 is a terminal retainer which also serves as a packing, 9 is a packing, 13 is an electric collecting washer connected to the electrode element. These components are secured to the case cover 10 by the rivet 8. Shown by 3 is the positive terminal. Shown by 4 is an electrode terminal which is connected to the positive electrode (not shown) of the electrode element 12 via the rivet 8 and the electric collecting washer 13. Shown by 2 is the charge-discharge lead one end of which is connected to the positive terminal 3 and the other end of which is connected to the electrode terminal 4. The positive terminal 3 and the electrode terminal 4 are fixed by the terminal retainer 6.

Shown by 1 is the pressure-sensing device provided between the electrode element 12 and the case cover 10 in such a way that it is laser welded to the latter to assure a hermetic seal. The pressure-sensing device 1 is partially recessed toward the interior of the battery. This pressure-sensing device 1 is so adapted that it deforms by reversing to convex toward the exterior of the battery in response to the increment of the pressure in the battery. Shown by 7 is a laser welding press plate for helping the pressure-sensing device 1 to be mounted on the case cover 10 hermetically. The terminal retainer 6 can be fixed to the press plate 7 by crimping its claw portion.

In this embodiment, the pressure-sensing device 1 is shaped to recess toward the interior of the battery and it has on its bottom a convex portion 5 which protrudes toward the exterior of the battery. When the pressure-sensing device 1 reverses by itself to deform, its convex portion 5 pushes and cuts the charge-discharge lead 2 which is fitted more exterior to the battery than the pressure-sensing device 1 (further upward in FIG. 4). The pressure-sensing device 1 is so adapted that once it has reversed by itself to deform, it maintains the deflection and will no longer revert to the initial concave form.

In this embodiment, the pressure-sensing device 1 has a rectangular profile (see FIG. 6A) and has- a single-stage recess formed in the middle, with the hemispherical projection 5 in the center (FIG. 6B). It should, however, be noted that this is not the sole case of the invention.

In this embodiment, the charge-discharge lead 2 is comprised of a ceramic substrate 14 having a thin conductive layer 15 made of copper formed thereon as shown in FIG. 7. As in the case of the pressure-sensing device 1, this is not the sole case of the charge-discharge lead 2. Preferably, in this case, the charge-discharge lead is made of a brittle or frangible substrate and an electric conductor.

As shown in FIG. 4, the sealed storage battery of the present invention has the electrode element 12 contained in the case 11 and the retainer 6 of the electrode terminal 4 and the positive terminal 3 which have the charge-discharge lead 2 connected above the pressure-sensing device 1 is fixed by crimping the claw portion of the laser welding press plate 7.

When the pressure in the storage battery incorporating the safety device of the present invention starts to increase, the pressure-sensing device assembled in the case cover reverses by itself under the increased pressure and the convex portion on the bottom of the deformed pressure-sensing device depresses the charge-discharge lead until it cuts the latter to interrupt the current flow. Even if the pressure in the battery reverts to the normal after the charge-discharge lead was cut, the pressure-sensing device will not buckle but keeps the broken charge-discharge lead in an elevated position, thereby ensuring that there will not be another current flow.

In this embodiment, the term "toward the interior of the storage battery" is referenced to the space within the storage battery which is defined by the case 11 and the case cover 10 and means the direction in which the electrode element 12 is contained (downward in FIG. 4) and the term "toward the exterior of the storage battery" means the opposite direction (upward in FIG. 4).

The safety device for a storage battery according to the present invention is comprised of a charge-discharge lead one end of which is connected to the positive electrode side of the storage battery and the other end of which is connected to the positive terminal of the storage battery, a pressure-sensing device provided in such a way that it is partially recessed toward the interior of the storage battery, and a convex portion of the pressure-sensing device that is formed by causing part of the bottom of said pressure-sensing device to protrude toward the exterior of the storage battery. If the charge-discharge lead is formed of a brittle or frangible substrate and an electric conductor, an increase in the pressure in the storage battery causes the concave pressure-sensing device to reverse by itself to deform toward the exterior of the storage battery so that the convex portion of the pressure-sensing device allows for positive cutting of the charge-discharge lead. The safety device is so adapted that the pressure-sensing means that has once reversed will not revert to the concave form and that the charge-discharge lead that has been cut will not conduct again; hence, the safety device of the invention has high reliability.

A sealed storage battery incorporating the safety device of the invention is superior to those which use the conventional safety devices. The safety device of the invention is applicable to cylindrical, prismatic and various other shapes of all kinds of sealed storage batteries including lead-acid batteries, alkaline batteries and non-aqueous electrolyte batteries. Thus, the present invention offers very great industrial benefits.

Second Embodiment

Figure 8:
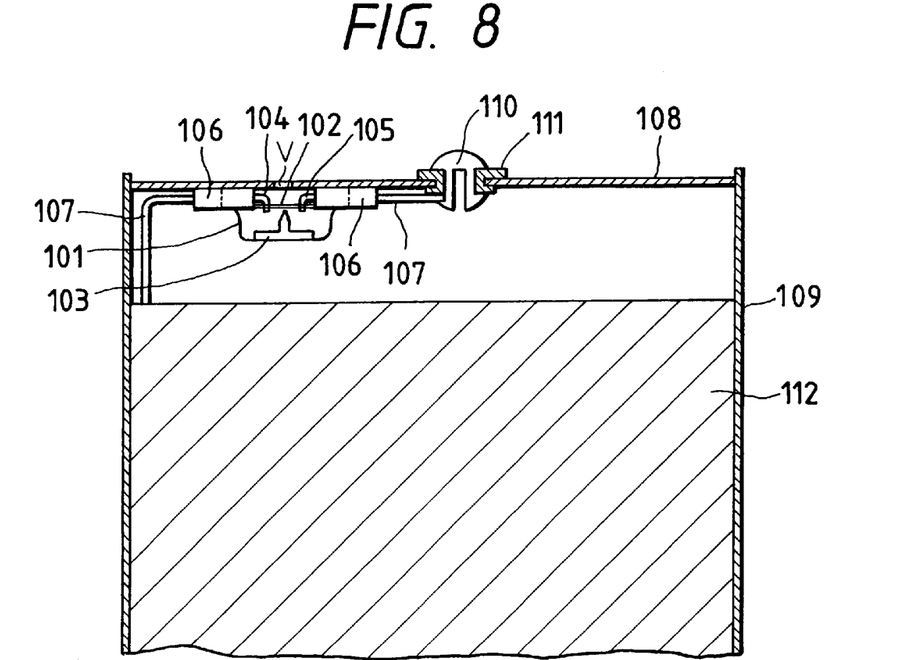
FIG. 8 is a sectional view showing the essential part of a storage battery incorporating a safety device of a second embodiment according to the present invention.
Figure 9:
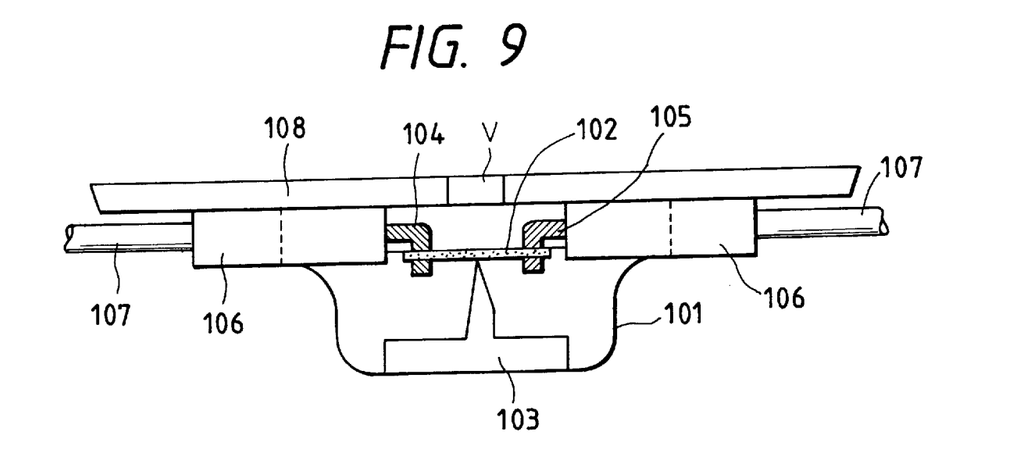
FIG. 9 is a longitudinal section view of the essential part of the safety device of a second embodiment.
Figure 10:
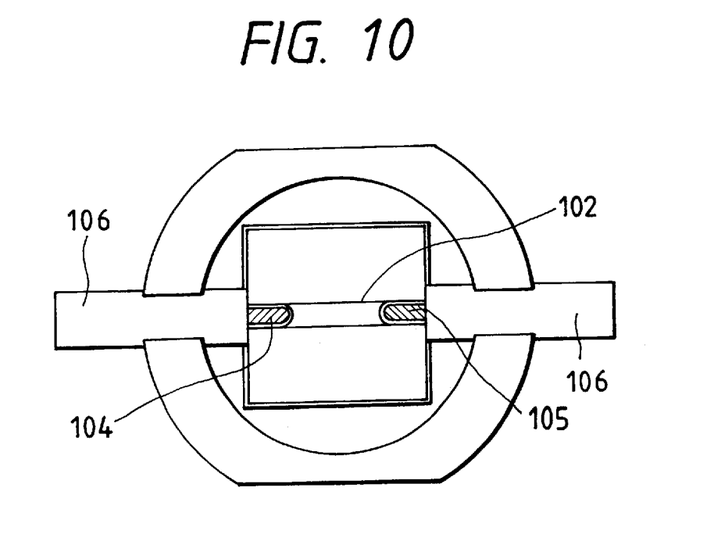
FIG. 10 is a cross sectional view of the essential part of the safety device shown in FIG. 9.

FIG. 8 is a sectional view showing the essential part of a storage battery incorporating the safety device of the second embodiment according to the present invention. FIG. 9 is a longitudinal sectional view of the essential part of the storage battery. FIG. 10 is a cross sectional view of the essential part of the safety device shown in FIG. 9.

Shown by 109 is a case which also serves as the negative terminal, 110 is the positive terminal, 111 is a packing, and 112 is an electrode element. Shown by 102 is a charge-discharge lead one end of which is connected to an electrode within the battery and the other end of which is connected to the positive terminal 110. Shown by 103 is charge-discharge lead cutting device, 104 is an internal terminal connected to an electrode in the battery, 105 is an internal terminal connected to the positive terminal 110, 107 is a connecting wire, and 108 is a case cover. The case cover 108 includes a gas vent hole V. Shown by 106 are retainers for fixing internal terminals 104 and 105 connected by the wire 107. Shown by 101 is pressure-sensing device in a concave form that is provided within the space defined by the electrode element 112 and the case cover 108; the pressure-sensing device 101 is so adapted as to be capable of deforming upward in FIG. 9 in response to an increasing pressure in the battery. The connecting wire 107 may be replaced by any member that is formed of an electrically conductive material.

Figure 11A:
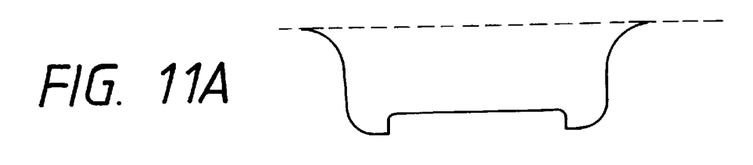
FIGS. 11A, 11B and 11C show modifications of a pressure-sensing device of the safety device of the second embodiment.
Figure 11B:
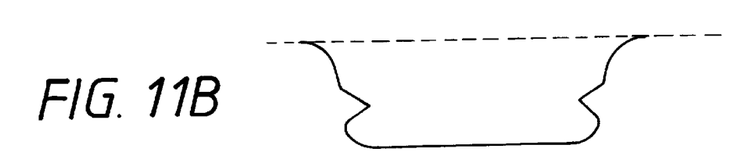
Figure 11C:
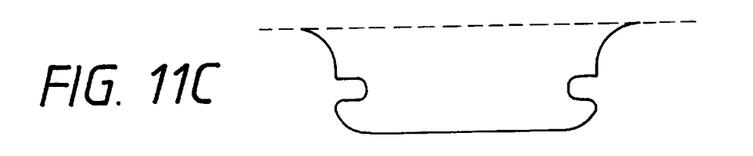

It is essential for the purposes of the present invention that the pressure-sensing device 101 is resistant not only to the electrolyte but also to corrosive gases being evolved during service. To this end, the pressure-sensing device 101 may be formed of corrosion-resistant materials such as stainless steel, copper, aluminum, etc. If the pressure-sensing device 101 is made of a corrosion-sensitive material, it can be put to practical use after sufficient corrosion resistance is imparted by a suitable treatment such as plating. In this embodiment, although the pressure-sensing device 101 is in a concave form, this may be modified in various ways. For example, the bottom has a convex projection as shown in FIG. 11A, a V-groove is cut in the surface of the lateral side as shown in FIG. 11B, or a U-groove is cut in the surface of the lateral side as shown in FIG. 11C.

The charge-discharge lead 102 may be formed of any materials that are commonly used in electrical connecting conductors, such as metals (copper, nickel, gold, silver and aluminum) and alloys (e.g. Ni/Al alloys). The charge-discharge lead 102 may be provided with an insulating or corrosion-resistant coat or, alternatively, it may be used uncoated. The charge-discharge lead 102 may be a thin wire or a sheet and it may assume any other shapes that do not interfere with effective cutting by the cutting device 103. If the charge-discharge lead 102 is adapted to work as a fuse, an excessive current that flows due to overcharging or some other reason can effectively be cut off by the melting of the lead.

The lead cutting device 103 may be an integral part of the pressure-sensing device 101 as shown in FIG. 8 or it may be provided as a separate member from the pressure-sensing device 101. In this alternative case, the lead-cutting device 103 is suspended in the space defined by the cover 108, internal terminal retainers 106 and pressure-sensing device 101, and when the pressure in the battery rises to a predetermined level, the pressure-sensing device 101 depresses the lead cutting device 103 so that the latter cuts the charge-discharge lead 102.

The lead cutting device 103 may typically be formed of an electrically non-conductive material selected from among ceramics, hard plastics, etc. However, depending on the specific design of the lead 102 (for example, it is so adapted that as soon as it is cut, it springs back or otherwise reacts to achieve complete separation from the cutting device 103), the latter may be formed of a conductive material such as a metal. The only requirement for the shape of the lead cutting device 103 is that it have a sharp edge in the portion responsible for cutting the charge-discharge lead 102.

As shown in FIG. 8, the sealed storage battery incorporating the safety device of this embodiment has the electrode element enclosed in the container case 109 and the retainers 106 of the terminals 104 and 105 between which the charge-discharge lead 102 is connected above the pressure-sensing device 101 are mounted hermetically in the case cover 108. The cutting device 103 is formed as an integral part of the bottom of the pressure-sensing device 101 in such a way that the cutting blade contacts the underside of the charge-discharge lead 102. As already mentioned, one end of the charge-discharge lead 102 is connected to the internal terminal 104 and the other end is connected to the internal terminal 105. If desired, the internal terminals may be omitted and one end of the lead may be directly coupled to a connecting wire on the internal electrode whereas the other end may be coupled directly to a connecting wire on the charge-discharge terminal.

If the pressure in the storage battery incorporating the safety device of the embodiment starts to increase for some reason such as overcharging or external short circuiting, the pressure-sensing device 101 in the safety device mounted hermetically in the case cover 108 deforms gradually under the increasing pressure and, as a result of this deformation, the charge-discharge lead cutting device 103 provided in contact with the charge-discharge lead 102 is depressed so that its cutting blade is pressed against the lead 102 to cut it, thereby interrupting the current flow.

In the embodiment described above, the safety device is mounted hermetically in the case cover 108. However, this is not the sole case of the invention and the safety device may be disposed in any suitable space such as the upper lateral side of the outer case.

The safety device for a storage battery according to the invention is comprised of a charge-discharge lead one end of which is connected to an electrode within the battery and the other end of which is connected to either the positive or the negative terminal of the battery, a charge-discharge lead cutting device, and a pressure-sensing device that deforms as the pressure in the battery increases, wherein the pressure-sensing device is so adapted that when it deforms as a result of the increase in the pressure in the battery depresses the charge-discharge lead cutting device so that the latter cuts the charge-discharge lead, thereby breaking the charge-discharge circuit in the battery.

The charge-discharge lead cutting device may be an integral part of the pressure-sensing device. If necessary, the charge-discharge lead cutting device may be formed of an electrically non-conductive material. In addition, the charge-discharge lead may be a fuse that blows out when an excessive current flows.

An advantage of using the safety device of the embodiment in a storage battery is that the cutting device cuts the charge-discharge lead as required, thereby assuring complete interruption of the flow of a current to the load.

Another advantage results if the charge-discharge lead is designed as a fuse and this is the fuse blowout which ensures positive interruption of an excessive current that flows due to overcharging or some other reason.

Hence, the increase in the temperature in the storage battery due to charging current or short-circuit can be suppressed in a sufficiently early stage to prevent the increment of the pressure in the battery and the resulting leakage of the electrolyte, thereby contributing to the enhancement of the performance of the storage battery.

The safety device of the embodiment according to the present invention is applicable to cylindrical, prismatic and various other shapes of all kinds of sealed storage batteries including lead-acid batteries, alkaline batteries and non-aqueous electrolyte batteries; thus, the invention offers very great industrial benefits.

Third Embodiment

Figure 12:
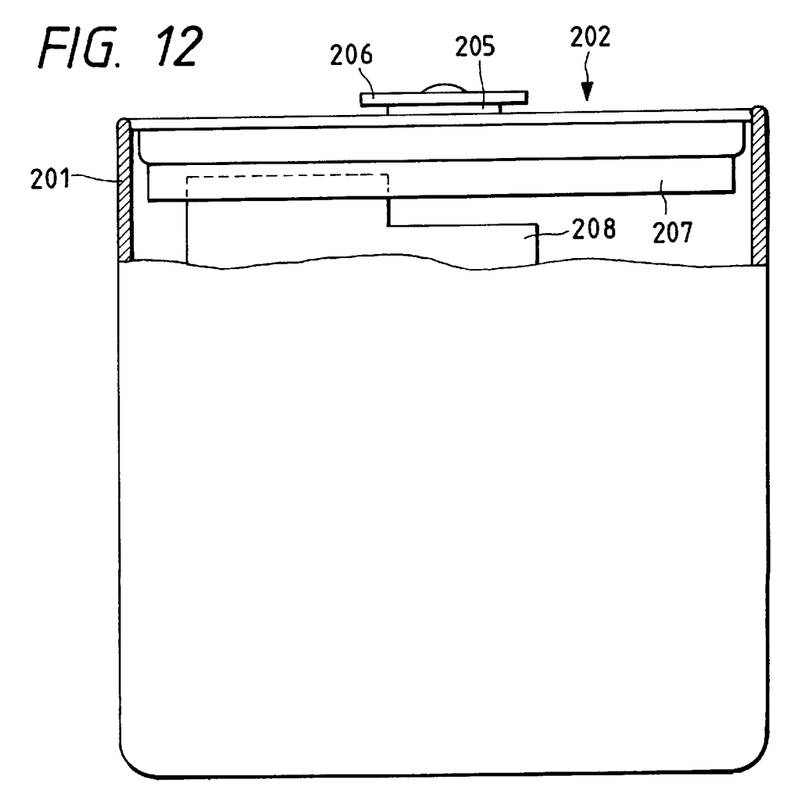
FIG. 12 is a partially cut-away front view showing a lithium-ion secondary battery of a third embodiment according to the present invention.

FIG. 12 is a partially cut-away front view showing a lithium-ion secondary battery of the third embodiment according to the present invention.

As shown in FIG. 12, in a prismatic battery case 201 having a bottom, power generation elements (not shown) such as a positive active material, a negative active material, a positive electric collector, a separator and an organic electrolyte solution are accommodated therein. In this lithium-ion secondary battery, for example, $LiCoO_2$ is used for the positive active material, and carbon having the graphite structure is used for the negative active material. The positive active material is held by the positive electric collector made of aluminum, and the negative active material is held by the negative electric collector made of copper. The separator is disposed between the positive active material and the negative active material, with which the organic electrolyte solution is filled.

A battery cover unit 202 described later is fitted to an opening portion of an upper part of the battery case 201. A center portion of the battery cover unit 202 is provided with a terminal 205 and a terminal plate 206. In the lithium-ion secondary battery shown in FIG. 12, the battery case 201 is a negative electrode, and the terminal 205 and the terminal plate 206 are a positive electrode.

Figure 13:
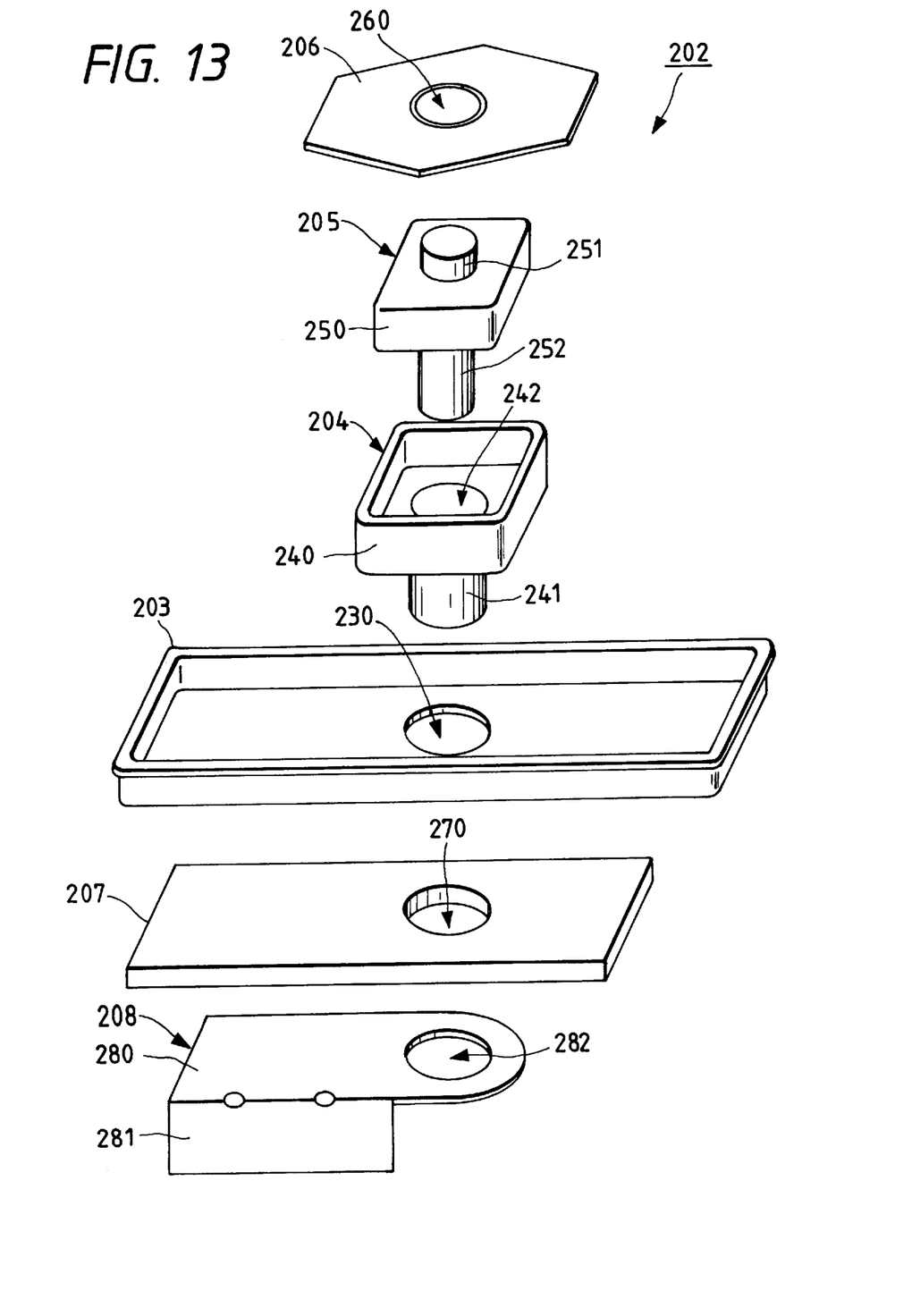
FIG. 13 is a perspective view showing a condition before assembling a battery cover unit of the third embodiment.

FIG. 13 is a perspective view showing a condition before assembling the battery cover unit 202. In addition, FIGS. 14A, 14B, 14C and 14D are a plan view, a partially cut-away view, a bottom view and a side view showing a condition after assembling the battery cover unit 202, respectively.

As shown in FIG. 13, the battery cover unit 202 is constructed by a cover plate 203, a packing 204, the terminal 205, the terminal plate 206, a packing 207 and an electric collection washer 208. The cover plate 203 is formed so as to have a concave cross section, which is provided with an opening 230 at a center portion thereof. Stainless steel, nickel-plated stainless steel, nickel-plated ferrous or the like is used for a material of the cover plate 203. The packing 204 includes a cylindrical portion 241 and a rectangular tube portion 240 having a bottom and a concave cross section. The bottom portion of the rectangular tube portion 240 is provided with an opening 242 being communicated with a hollow portion of the cylindrical portion 241. The packing 204 is formed integrally of a resin such as polypropylene and polyethylene.

The terminal 205 has a rivet shape which is formed integrally of a prismatic body portion 250, a columnar upper part shaft 251 and cylindrical lower part shaft 252. Aluminum or aluminum-alloy is preferably used as the material of the terminal 205. The terminal plate 206 is formed to be substantially hexagonal, and the opening 260 is provided in the center portion thereof. An inner wall of the opening 260 has a tapered shape so that the diameter of the wall gradually decreases in the direction from the outside of the battery to the inside thereof. Stainless steel, nickel-plated stainless steel, nickel-plated ferrous or the like is used for the material of the terminal plate 206.

The packing 207 is comprised of a resin such as polypropylene or polyethylene, and formed to have a platelike shape. The packing 207 is provided with an opening 270. The electric collection washer 208 is comprised of a horizontal plate 280 and a vertical plate 281 being formed by bending one plate. The horizontal plate 280 is provided with an opening 282. As similar to the terminal 205, aluminum or aluminum-alloy is used for the material of the electric collection washer 208.

Figure 14A:
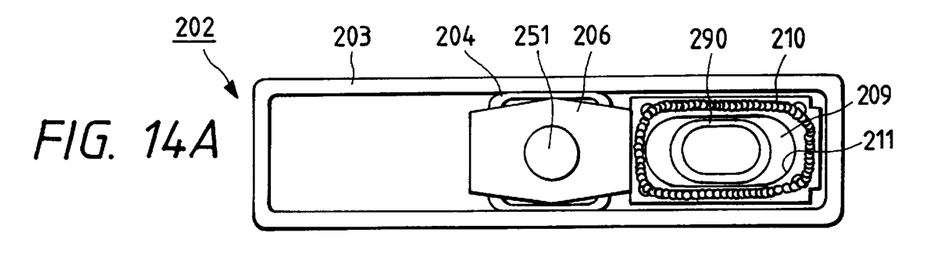
FIGS. 14A, 14B, 14C and 14D are a plan view, a partially cut-away view, a bottom view and a side view showing a condition after assembling the battery cover unit, respectively.
Figure 14B:
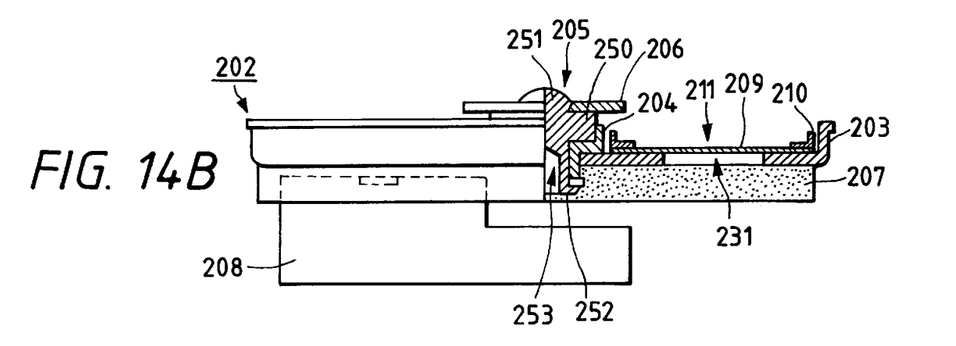
Figure 14C:
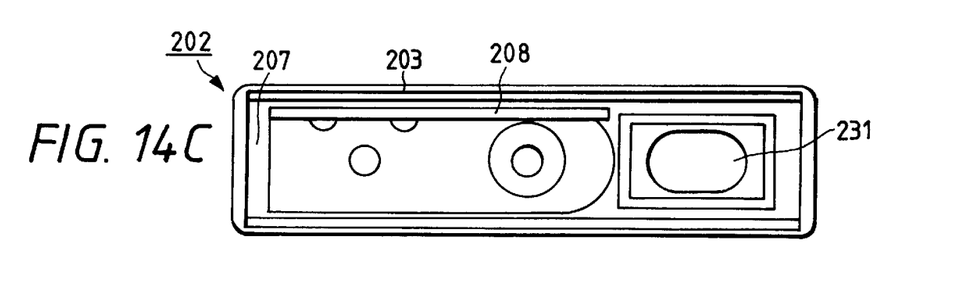
Figure 14D:
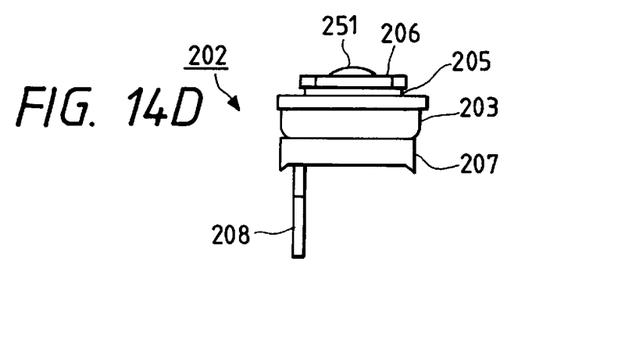

In case of assembling the cover unit 202, the upper part shaft 251 of the terminal 205 is inserted into the opening 260 of the terminal plate 206 as well as the lower part shaft 252 and the body portion 250 are inserted to be fitted in the cylindrical portion 241 and the rectangular tube portion 240, respectively. The cylindrical portion 241 is inserted into the opening 230 of the cover plate 203 and the opening 270 of the packing 207. Further, the lower part shaft 252 projecting from the cylindrical portion 241 of the packing 204 is inserted to be fitted to the opening 282 of the electric collection washer 208. Then, the upper part shaft 251 of the terminal 205 is crimped with respect to the terminal plate 206 while the lower part shaft 252 of the terminal 205 is crimped with respect to the electric collection washer 208. As a result, the battery cover unit 202 as shown in FIGS. 14A to 14C can be assembled. A positive electric collector (not shown) is attached to the vertical plate 281 of the electric collection washer 208 by crimping or the like.

Figure 15:
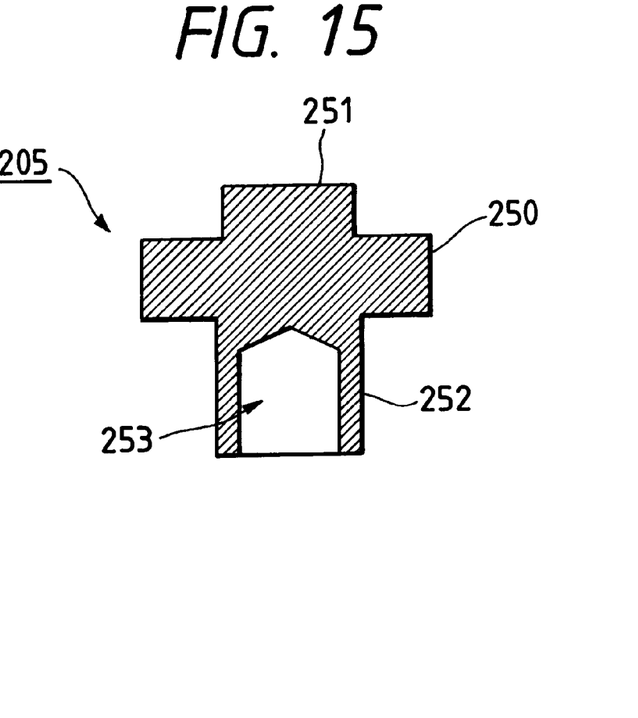
FIG. 15 is a cross sectional view of a terminal of a third embodiment.
Figure 16:
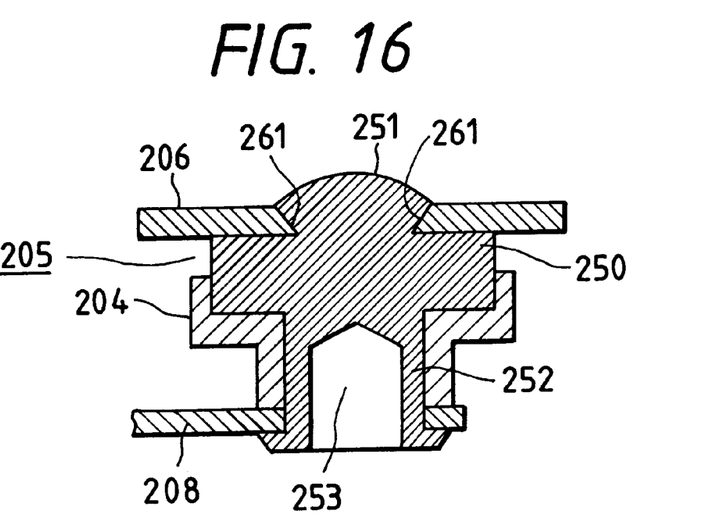
FIG. 16 is a cross sectional view showing a condition where the terminal is crimped to a terminal plate and an electric collection washer.

Here, the structure and the crimping method of the terminal 205 will be specifically described as follows. FIG. 15 is a cross sectional view of the terminal 205, and FIG. 16 is a cross sectional view showing a condition where the terminal 205 is crimped to the terminal plate 206 and the electric collection washer 208.

As shown in FIG. 15, the solid upper part shaft 251 is provided on an upper surface of the body portion 250 to be formed integrally therewith. The lower part shaft 252 having a hollow portion 253 is provided on an lower surface of the body portion 250 to be formed integrally therewith.

As shown in FIG. 15, the solid upper part shaft 251, the body portion 250 and the lower part shaft 252 having a hollow portion 253 are integrated to form the terminal 205. The solid upper part shaft 251 and the lower part shaft 252 are provided on an upper surface and lower surface of the body portion 250, respectively. The upper part shaft 251 of the terminal 205 is inserted into the opening 260 of the terminal plate 206 (see FIG. 13), and a projecting portion of the upper part shaft 251 is crushed so as to crimp the upper part shaft 251 to the terminal plate 206. In this case, the inner wall 261 of the opening 260 of the terminal plate 206 is formed taperingly. Therefore, even if a head portion of the upper part shaft 251 is formed to be arc-shaped and the projecting portion above the terminal plate 206 is made small, the terminal 205 can be surely fixed to the terminal plate 206.

In addition, the lower part shaft 252 of the terminal 205 is inserted into the opening 282 (see FIG. 13) of the electric collection washer 208 through the packing 204 and the end portion of the lower part shaft 252 is impacted so as to crimp the lower part shaft 252 of the terminal 205 to the electric collection washer 208. In this regard, the lower part shaft 252 is cylindrical and has the hollow portion 253 so that the end portion of the lower part shaft 252 is easily crimped to the electric collection washer 208.

As shown in FIG. 14, in the lithium-ion secondary battery of the embodiment, since the terminal plate 206 having a wide area is mounted on the terminal 205, a lead can be easily connected to the terminal plate 206. Particularly, the terminal plate 206 is formed of stainless steel, nickel-plated stainless steel, nickel-plated ferrous or the like so that the lead formed of nickel plate is easily connected by the spot welding. Accordingly, if the lithium-ion secondary battery is integrated with a protection circuit and an outer terminal as a battery pack, the electric connection between the terminal 205 and the protection circuit and/or the outer terminal can be surely and easily conducted.

In addition, the electric collection washer 208 is assembled to the terminal 205 so that the positive electric collector is easily attached to the electric collection washer 208 by crimping or the like. Accordingly, the electric connection between the terminal 205 and the positive electric collector can be surely and easily performed.

Further, since the terminal 205 and the electric collection washer 208 is formed of aluminum or aluminum-alloy, the battery has a high resistance to the electric corrosion and can enhance the workability and lightness thereof, thereby reducing the cost for manufacturing thereof.

Furthermore, the packing 204 is provided between the terminal 205 and the cover plate 209 so as to enhance the hermetic ability and insulation performance thereof. Moreover, the sealing of the inside of the battery can be maintained even when mechanical or heat shock is applied.

On the other hand, in the lithium-ion secondary battery according to the embodiment, the cover plate 203 is provided with a oval gas discharging opening 231 as shown in FIGS. 14B and 14C. A metal thin plate 209 is disposed on the gas discharging opening 231 of the cover plate 203, and a pressure plate 210 is further mounted on the metal thin plate 209. The metal plate 209 having a thickness of approximately 30 μm is made of an annealed nickel by rolling. The metal thin plate 209 is provided with a groove 290 by etching process. The thickness of the metal plate 209 at the groove 290 is 5 μm. The shape of a portion surrounded by the groove 290 is similar to that of the gas discharging opening 231, which is oval slightly smaller than the gas discharging opening 231. The pressure plate 210 is made of stainless steel, which is provided with a oval penetration opening 211. After conducting the spot welding to four corners of the pressure plate 210, a laser welding is conducted to an outer periphery of the penetration opening 211 of the pressure plate 210 so as to form a laminated product including the cover plate 203, the metal thin plate 209 and the pressure plate 210. A safety valve mechanism can be constructed by the laminated product. Accordingly, a safety of the battery can be ensured with maintaining the hermetic ability thereof.

In addition, the safety devices in the first and second embodiment can be also applied to the battery as described in this third embodiment. It is preferable to apply the safety device in the first or second embodiment of the present invention to the battery of the present invention.

Here, power generation elements are not limited to the elements in the above embodiment. A material capable of dedoping or doping the lithium ion is used for the positive active material, which is lithium-cobalt oxide, lithium-manganese oxide, lithium-nickel oxide, lithium-chromium oxide, lithium-vanadium oxide, lithium-molybdenum oxide, lithium-molybdenum disulfide, lithium-titanium oxide, lithium-sulfide or the like, or a complex compound of those materials. In addition, for the negative active material, metallic lithium, lithium-alloy or carbon material capable of dedoping or doping the lithium ion such as graphite, heat decomposition carbon, pitch coke, needle coke, petroleum coke, or a burned material of organic polymer such as phenol resin, furan resin or polyacrylonitrile can be used.

Further, for the electrolyte in the organic electrolyte solution, one or a mixture of at least two of lithium salts which is $LiClO_4$, $LiAsF_6$, $LiPF_6$, $LiBF_4$, $CH_3SO_3Li$, $CF_3SO_3Li$, $(CF_3SO_2)_2NLi$ and the like can be used. Moreover, for the solvent of the organic electrolyte solution, for example, one or mixture of at least two of polypropylene carbonate, ethylene carbonate, dimethyl carbonate, diethyl carbonate, methylethyl carbonate, 1,2-dimethoxyethane, 1,2-diethoexyethane, γ-butyrolactam, tetrahydrofuran, 2-methyltetrahydrofuran, 1,3-dioxolan, sulfolan, methylsulfolan, acetonitrile, propionitrile, methyl formic acid, ethyl formic acid, methyl acetate, ethyl acetate and the like can be used. As the separator, one or a laminated film of at least two of fine porous films each made of one polyolefin such as polyethylene or polypropylene can be used. Moreover, a unwoven single film of polyolefin, polyester, polyamide, cellulose or the like, or laminated film of the fine porous film and the unwoven single film can be used for the separator. Particularly, the fine porous film made of polyethylene is preferably used.

Although the above described embodiment is applied to the prismatic secondary battery, the present invention can be also applied to a cylindrical secondary battery. In addition, the present invention is not limited to the lithium-ion secondary battery but can be applied to the other lithium batteries containing the organic solvent and a lithium primary battery.

Further, although the body portion 250 of the terminal 205 is formed to be prismatic in the above embodiment, the shape of the body portion is not limited to that of the embodiment but can be formed, for example, in cylindrical shape. In this case, the packing 204 have to be formed in a shape corresponding to the terminal 205. Moreover, although the terminal plate 206 is formed hexagonally, the shape of the terminal plate 206 is not limited to that of the above embodiment but can be formed in polygonal shape, circular shape, oval shape or the other shapes.

As described above, the present invention can be provide the battery which can easily conduct the electric connection. In addition, in case of using the insulation packing, the terminal having an excellent hermetical ability can be obtained. Further, if the terminal and the electric collection member is made of aluminum or aluminum-alloy, the battery having high resistance to the electric corrosion, which enhances workability and lightness thereof, thereby reducing the cost for manufacturing thereof.

What is claimed is:

1. A safety device for a storage battery, comprising:
  a charge-discharge lead one end of which is connected to a positive electrode side of said storage battery and the other end of which is connected to a positive terminal of said storage battery;
  pressure-sensing means having a concave form which deforms to convex toward an exterior of said storage battery in response to an increase of the pressure in said storage battery, said pressure-sensing means maintaining the deformation without reverting to said concave form; and
  cutting means for cutting said charge-discharge lead, said cutting means being pressed by the deformation of said pressure-sensing means to cut said charge-discharge lead, said cutting means being an integral part of said pressure-sensing means.

2. A safety device as claimed in claim 1, wherein said cutting means comprises an electrically non-conductive material.

3. A safety device as claimed in claim 1, wherein said charge-discharge lead is a fuse.

4. A safety device as claimed in claim 1, wherein said pressure-sensing means is resistant to an electrolyte in said storage battery and to corrosive gasses generated by said storage battery.

5. A safety device as claimed in claim 1, wherein said pressure-sensing means has a convex projection at a bottom thereof.

6. A safety device as claimed in claim 1, wherein said pressure-sensing means has a V-groove being cut in a surface of a lateral side thereof.

7. A safety device as claimed in claim 1, wherein said pressure-sensing means has a U-groove being cut in a surface of a lateral side thereof.

8. A safety device as claimed in claim 1, wherein said cutting means is in a convex form.

9. A safety device as claimed in claim 8, wherein said cutting means is provided in a substantially center of said pressure-sensing means.

10. A safety device as claimed in claim 8, wherein said charge-discharge lead comprises a frangible substrate and an electric conductor.

11. A safety device as claimed in claim 10, wherein said electric conductor is printed on said frangible substrate.

12. A safety device for a storage battery, comprising:
  a charge-discharge lead on end of which is connected to a positive electrode side of said battery and the other end of which is connected to a positive terminal of said storage battery, said charge-discharge lead comprising a frangible substrate and an electric conductor;

pressure-sensing means having a concave form which is deformed to convex toward an exterior of said storage battery in response to an increase of the pressure in said storage battery, said pressure-sensing means maintaining the deformation without reverting to said concave form; and cutting means for cutting said charge-discharge lead, said cutting means being pressed by the deformation of said pressure-sensing means to cut said charge-discharge lead, said cutting means being an integral part of said pressure-sensing means.

13. A safety device as claimed in claim 12, wherein said electric conductor is printed on said brittle substrate.

14. A safety device for a storage battery, the storage battery having a case with a vent hole, said safety device comprising:

a charge-discharge lead one end of which is connected to a positive electrode side of said storage battery and the other end of which is connected to a positive terminal of said storage battery;

pressure-sensing means which deforms in response to an increase of the pressure in said storage battery; and cutting means for cutting said charge-discharge lead, said cutting means being pressed by the deformation of said pressure-sensing means to cut said charge-discharge lead, said cutting means being an integral part of the pressure-sensing means, so that when said cutting means cuts said charge-discharge lead, not only is current interrupted, but excess gas is permitted to simultaneously escape through the vent hole.

15. A safety device for a storage battery, the storage battery having a case with a vent hole, said safety device comprising:

a charge-discharge lead one end of which is connected to a positive electrode side of said storage battery and the other end of which is connected to a positive terminal of said storage battery;

pressure-sensing means which is deformed to convex toward an exterior of said storage battery in response to the increase of the pressure in said storage battery, said pressure-sensing means being in a concave form; and cutting means for cutting said charge-discharge lead, said cutting means being pressed by the deformation of said pressure-sensing means to cut said charge-discharge lead, said cutting means being an integral part of the pressure-sensing means, so that when said cutting means cuts said charge-discharge lead, not only is current interrupted, but excess gas is permitted to simultaneously escape through the vent hole.

* * * * *